United States Patent [19]

Sabi et al.

[11] Patent Number: 4,582,452

[45] Date of Patent: Apr. 15, 1986

[54] PROCESS FOR PREPARING STABLE AQUEOUS GEL

[75] Inventors: Mineo Sabi, Kyoto; Kinya Yokota, Shiga; Hiroshi Nishiguchi, Moriyama; Hiroshi Hotta; Satoshi Hiratsuna, both of Kyoto, all of Japan

[73] Assignee: Dai-Ichi Kogyo Seiyaku Co., Ltd., Kyoto, Japan

[21] Appl. No.: 616,375

[22] Filed: Jun. 1, 1984

[30] Foreign Application Priority Data

Jun. 3, 1983 [JP] Japan .................................. 58-99996

[51] Int. Cl.$^4$ ........................ C09K 17/00; E02D 3/12; E21B 43/22
[52] U.S. Cl. ............................. 405/264; 252/8.55 R; 405/270; 523/130; 524/916
[58] Field of Search ........................ 252/315.1, 8.55 R; 405/264, 270; 524/916; 523/130

[56] References Cited

U.S. PATENT DOCUMENTS

| | | | |
|---|---|---|---|
| 2,801,984 | 8/1957 | Morgan et al. | 405/264 X |
| 3,502,149 | 3/1970 | Pence, Jr. | 252/8.55 R X |
| 3,909,423 | 9/1975 | Hessert et al. | 252/8.55 R X |
| 4,015,991 | 4/1977 | Persinski et al. | 523/130 X |
| 4,055,502 | 10/1977 | Swanson | 252/8.55 R X |

*Primary Examiner*—Richard D. Lovering
*Attorney, Agent, or Firm*—Armstrong, Nikaido, Marmelstein & Kubovcik

[57] ABSTRACT

A process for forming a gel by gelling an aqueous solution of a water-soluble polymer with a chromium compound as a gelling agent, in which a copolymer of acrylamide, 0.5 to 40% by mole of an unsaturated sulfonic acid or its salt, and optionally an unsaturated carboxylic acid or its salt having an intrinsic viscosity of at least 10 in 1N-NaNO$_3$ at 30° C., is used as the water-soluble polymer, and which is availably applied to improvement of water-oil ratio in oil production and to civil engineering for preventing leakage of underground water. The formed gel is very stable in a water system containing salts in high concentrations at high temperatures.

7 Claims, No Drawings

PROCESS FOR PREPARING STABLE AQUEOUS GEL

BACKGROUND OF THE INVENTION

The present invention relates to improvements in forming a stable aqueous gel, and more particularly to an improved process for preparing a strong, salt-tolerant and heat-stable aqueous gel useful in improving the water-oil ratio in oil production or useful as an agent for cutting off water used in civil engineering and construction works.

In oil production and underground engineering works, leakage of underground water often causes problems. A technique of blocking the passage of underground water using a gel has been adopted for preventing the leakage of underground water.

The gel is usually formed by gelling a polymer dissolved in underground water containing salts in high concentrations with a gelling agent. The gel is required to have an adequate gelation time so that it gels at a desired place, as well as high gel strength and a good long term stability. For this purpose, water-soluble polymer such as acrylamide polymers, mixtures thereof with biopolymers such as xanthan gum, and carboxymethyl cellulose have been hitherto employed in the form of an aqueous solution.

Polyvalent metal ions such as $Al^{3+}$, $Cr^{3+}$, $Ca^{2+}$ and $Mg^{2+}$ are employed for the gelation, and among them, the gelation using $Cr^{3+}$ or $Al^{3+}$ has been practiced.

In case of the gelation with $Al^{3+}$, trivalent aluminum cations bind to the anionic groups of polymers to form a three-dimensionally cross-linked polymer, thus forming a gel. The gelation with $Cr^{3+}$ is made by reducing $Cr^{6+}$ to $Cr^{3+}$ by a reducing agent, but the detailed gelation mechanism has not been sufficiently made clear. The correlation of gelation time for polymer solution is merely reported by Jordan and Ronald in Society of Petroleum Engineers Journal, April 229(1981).

Conventional gel-forming materials used for preventing the leakage of underground water have the disadvantage that the gel releases water at a high temperature, particularly in a high salinity brine system, thus resulting in collapse of the gel. For such a reason, no satisfactory effect has been obtained.

It is an object of the present invention to provide a water-soluble polymer suitable for use in preventing leakage of underground water, particularly underground water containing salts in high concentrations at high temperatures.

A further object of the present invention is to provide a composition capable of forming a strong and stable gel with an adequate gelation time even in a high salinity brine and high temperature system.

Another object of the present invention is to provide an improved process for preparing a strong and stable aqueous gel having a salt tolerance and a heat stability, which can be easily applied to improvement of water-oil ratio in oil production, prevention of leakage of underground water in civil engineering works and the like.

These and other objects of the present invention will become apparent from the description hereinafter.

SUMMARY OF THE INVENTION

It has now been found that a specific acrylamide copolymer is very useful as a gel forming material and forms a strong and stable gel with a Cr compound as a gelling agent even in high salinity brine and high temperature systems.

In accordance with the present invention, there is provided an improvement in a process for preparing a stable aqueous gel by gelling an aqueous solution of a water-soluble polymer with a chromium compound as a gelling agent, which comprises employing as the water-soluble polymer a copolymer consisting essentially of 99.5 to 60% by mole of acrylamide, 0.5 to 40% by mole of an unsaturated sulfonic acid or its salt, and optionally 0 to 39.5% by mole of an unsaturated carboxylic acid or its salt, provided that the total content of the unsaturated sulfonic acid or its salt and the unsaturated carboxylic acid or its salt is from 0.5 to 40% by mole, said copolymer having an intrinsic viscosity of at least 10 in 1N-$NaNO_3$ at 30° C.

DETAILED DESCRIPTION

It is necessary that the acrylamide copolymers used in the present invention have a intrinsic viscosity $[\eta]$ (1N-$NaNO_3$ solution, 30° C.) of at least 10 (molecular weight of not less than about 5,000,000), preferably at least 15 (molecular weight of not less than 10,000,000). The molecular weight (M) is calculated on the basis of the equation: $[\eta]=3.73\times10^{-4}M^{0.66}$. In general, the higher the molecular weight, the more easily does gelation occur and the stronger is the formed gel. When the molecular weight is low, the gelation is hard to obtain, and even if a gel is formed, the gel strength is low.

Examples of the unsaturated sulfonic acids and the salts thereof used in the present invention are, for instance, 2-acrylamide-2-methylpropanesulfonic acid, vinylsulfonic acid, allysulfonic acid, 2-methylallylsulfonic acid, styrenesulfonic acid, 2-sulfoethyl methacrylate, and their salts. Examples of the unsaturated carboxylic acids and the salts thereof used in the present invention are, for instance, acrylic acid, methacrylic acid, maleic acid, and their salts. The salts of the unsaturated sulfonic acids and carboxylic acids are usually alkali metal salts, especially sodium salts.

The acrylamide copolymers used in the present invention contain 0.5 to 40% by mole of units of the unsaturated sulfonic acids or their salts. The acrylamide copolymers may further contain units of the unsaturated carboxylic acids or their salts. In case of using both of the carboxylic and sulfonic monomers, the total content of the units of the carboxylic acids or their salts and the units of the sulfonic acids or their salts in the copolymer should not exceed 40% by mole. When the content is more than 40% by mole, the obtained gel is low in gel strength, or even if a strong gel is temporarily formed, it is prone to release water with the lapse of time and becomes unstable. It is essential that the acrylamide copolymers contain at least 0.5% by mole of units of the unsaturated sulfonic acid or its salt as an essential comonomer component, so that the gelation is obtained easily and the formed gel is stable. The content of the carboxylic acids or their salts is selected from 0 to 39.5% by mole, especially 0.1 to 39.5% by mole.

The acrylamide copolymers of the present invention are prepared by polymerizing acrylamide, an unsaturated sulfonic acid or its salt, and optionally a prescribed amount of an unsaturated carboxylic acid or its salt, in the presence of a radical polymerization initiator. An agent for adjusting the polymerization may be employed, as occasion demands.

The acrylamide copolymer is formed into an aqueous solution. In general, the concentration of the copolymer is from 0.05 to 2.0% by weight. Known chromium gelling agents such as sodium dichromate are added to the solution prior to the use with a reducing agent such as sodium sulfite, sodium thiosulfate or thiourea.

The present invention is more specifically described and explained by means of the following Examples, in which all % are by weight unless otherwise noted. It is to be understood that the present invention is not limited to the Examples, and various changes and modifications may be made in the invention without departing from the spirit and scope thereof.

EXAMPLE 1

In water were dissolved 13.8 g. of acrylamide, 2.8 g. of sodium 2-acrylamide-2-methylpropanesulfonate and 3.4 g. of sodium acrylate (molar ratio 80/5/15) to give 100 g. of a solution. Ammonium persulfate as a polymerization initiator was added to the solution and the polymerization was carried out at 40° C., while bubbling nitrogen gas through the solution. After the completion of the polymerization, the reaction mixture was poured into a large amount of methanol to precipitate the produced copolymer. The precipitate was filtered off and dried to give a powdery polymer H. The intrinsic viscosity [$\eta$] of the polymer H was 22.0 (molecular weight of about $18 \times 10^6$).

Polymers A to G and I to L were produced in the same manner as above except that the ingredients shown in Table 1 were used.

The obtained acrylamide copolymers were subjected to the following gelation test.

Gelation testing method (1) Gelation condition:
Concentration of polymer: 4,000 p.p.m.
Gelling agent:
  sodium dichromate: 1,500 p.p.m.
  sodium sulfite: 1,500 p.p.m.
Water: deionized water or brine (10% NaCl aqueous solution)

(2) Preparation of a polymer solution
To a 1 liter beaker was added 500 ml. of deionized water or brine. While stirring with a magnetic stirrer, 2 g. of a polymer powder was added to the beaker and was completely dissolved by stirring for 2 hours.

(3) Gelation test
In a 200 ml. beaker was placed 100 ml. of the polymer solution. In the solution were dissolved 0.15 g. of sodium dichromate and then 0.15 g. of sodium sulfite with stirring. The solution was placed in sample bottles, and they were kept at room temperature or 80° C. The change of the solution was observed with the lapse of time by measuring the viscosity using a helipass spindle of a Brookfield viscometer.

The results of the stability test are shown in Table 2 (room temp., deionized water), Table 3 (room temp., brine) and Table 4 (80° C., brine).

TABLE I

| | Composition of polymer (mole %) | | | | Intrinsic viscosity of polymer |
|---|---|---|---|---|---|
| | Acrylamide | Sodium acrylate | Sulfonate monomer | Kind of sulfonate monomer | |
| A | 97.5 | 2.5 | 0 | — | 5.7 |
| B | 97.5 | 0 | 2.5 | Sodium 2-acrylamide-2-methylpropanesulfonate | 12.4 |
| C | 90 | 5 | 5 | Sodium 2-acrylamide-2-methylpropanesulfonate | 7.3 |
| D | 85 | 10 | 5 | Sodium 2-acrylamide-2-methylpropanesulfonate | 12.4 |
| E | 95 | 2.5 | 2.5 | Sodium 2-acrylamide-2-methylpropanesulfonate | 17.6 |
| F | 60 | 30 | 10 | Sodium 2-acrylamide-2-methylpropanesulfonate | 17.9 |
| G | 40 | 30 | 30 | Sodium 2-acrylamide-2-methylpropanesulfonate | 21.5 |
| H | 80 | 15 | 5 | Sodium 2-acrylamide-2-methylpropanesulfonate | 22.0 |
| I | 80 | 16 | 4 | Sodium vinylsulfonate | 11.3 |
| J | 80 | 15 | 5 | Sodium styrenesulfonate | 10.1 |
| K | 80 | 17 | 3 | Sodium allylsulfonate | 10.6 |
| L | 80 | 20 | 0 | — | 25.3 |

TABLE 2

Long term stability test of gels (room temp., deionized water)

| Polymer | After 3 days Viscosity (cP) | After 1 month Viscosity (cP) | After 1 month Water released (%) | After 3 months Viscosity (cP) | After 3 months Water released (%) |
|---|---|---|---|---|---|
| A | no gelation | — | — | — | — |
| C | no gelation | — | — | — | — |
| E | $25.0 \times 10^6$ | $25.3 \times 10^6$ | 0 | $25.7 \times 10^6$ | 0 |
| G | $3.1 \times 10^6$ | $2.9 \times 10^6$ | 0 | $4.7 \times 10^6$ | 3 |
| H | $37.5 \times 10^6$ | $41.2 \times 10^6$ | 0 | $41.8 \times 10^6$ | 0 |
| I | $1.5 \times 10^6$ | $1.3 \times 10^6$ | 0 | $2.1 \times 10^6$ | 0 |

It is observed in Table 2 that when the intrinsic viscosity is low, gelation does not occur even if a gelling agent is added to the polymer solution, and that even if the intrinsic viscosity is high, a polymer having a low content of acrylamide is low in gelation force.

TABLE 3

Long term stability test of gels (room temp., brine)

| Polymer | After 3 days Viscosity (cP) | After 1 month Viscosity (cP) | After 1 month Water released (%) | After 3 months Viscosity (cP) | After 3 months Water released (%) |
| --- | --- | --- | --- | --- | --- |
| B | $11.3 \times 10^6$ | $17.4 \times 10^6$ | 0 | $19.8 \times 10^6$ | 0 |
| D | $13.5 \times 10^6$ | $19.3 \times 10^6$ | 0 | $21.2 \times 10^6$ | 0 |
| F | $85.7 \times 10^6$ | $98.5 \times 10^6$ | 0 | $117 \times 10^6$ | 2.5 |
| G | $56.6 \times 10^6$ | $70.3 \times 10^6$ | 25 | measurement impossible | 70 |
| H | $125 \times 10^6$ | $168 \times 10^6$ | 0 | $195 \times 10^6$ | 5.7 |
| J | $4.5 \times 10^6$ | $5.3 \times 10^6$ | 0 | $5.7 \times 10^6$ | 0 |

It is seen from Table 3 that the gelation force in the brine is larger than that in the deionized water system, but a polymer having a low content of acrylamide is poor in gel stability.

TABLE 4

Long term stability test of gels (80° C., brine)

| Polymer | After 1 day Viscosity (cP) | After 2 weeks Viscosity (cP) | After 2 weeks Water released (%) | After 1 month Viscosity (cP) | After 1 month Water released (%) |
| --- | --- | --- | --- | --- | --- |
| A | no gelation | — | — | — | — |
| C | no gelation | — | — | $0.7 \times 10^6$ | 0 |
| D | $23.5 \times 10^6$ | $31.3 \times 10^6$ | 0.5 | $33.8 \times 10^6$ | 2 |
| E | $78.1 \times 10^6$ | $120 \times 10^6$ | 0 | $131 \times 10^6$ | 0.7 |
| F | $93.4 \times 10^6$ | $138 \times 10^6$ | 0.3 | $150 \times 10^6$ | 1.5 |
| H | $130 \times 10^6$ | $195 \times 10^6$ | 1.5 | over $200 \times 10^6$ | 7.5 |
| K | $4.3 \times 10^6$ | $7.3 \times 10^6$ | 0 | $9.5 \times 10^6$ | 0 |
| L | $110 \times 10^6$ | $175 \times 10^6$ | 30 | over $200 \times 10^6$ | 55 |

It is seen from Table 4 that a strong gel can be formed even at high temperatures according to the present invention.

EXAMPLE 2

The following gelation tests were made by employing the acrylamide copolymers produced in Example 1.

Gelation testing method (1) Gelation condition
Concentration of polymer: 5,000 p.p.m.
Gelling agent:
sodium dichromate: 2,000 p.p.m.
sodium thiosulfate or thiourea: 2,000 p.p.m.
Water: brine (10% aqueous solution of NaCl)
(2) Preparation of a polymer solution According to Example 1
(3) Gelation test According to Example 1

The results of the gelation test using sodium thiosulfate as a reducing agent are shown in Table 5, and the results of the gelation test using thiourea as a reducing agent are shown in Table 6.

TABLE 5

Long term stability test of gels (80° C., brine, sodium thiosulfate)

| Polymer | After 1 day Viscosity (cP) | After 2 weeks Viscosity (cP) | After 2 weeks Water released (%) | After 1 month Viscosity (cP) | After 1 month Water released (%) |
| --- | --- | --- | --- | --- | --- |
| B | no gelation | $2.5 \times 10^6$ | 0 | $4.3 \times 10^6$ | 0 |
| D | $11.8 \times 10^6$ | $25 \times 10^6$ | 0 | $41.3 \times 10^6$ | 5 |
| F | $65.2 \times 10^6$ | $141 \times 10^6$ | 1 | $195 \times 10^6$ | 3.8 |
| G | $72.5 \times 10^6$ | measurement impossible | 75 | — | 100 |
| H | $98.6 \times 10^6$ | $157 \times 10^6$ | 0 | over $200 \times 10^6$ | 3 |
| L | $63.9 \times 10^6$ | $135 \times 10^6$ | 25 | measurement impossible | 85 |

TABLE 6

Long term stability test of gels (80° C., brine, thiourea)

| Polymer | After 1 day Viscosity (cP) | After 2 weeks Viscosity (cP) | After 2 weeks Water released (%) | After 1 month Viscosity (cP) | After 1 month Water released (%) |
| --- | --- | --- | --- | --- | --- |
| A | no gelation | — | — | — | — |
| B | no gelation | $1.3 \times 10^6$ | 0 | $2.1 \times 10^6$ | 0 |
| E | $38.5 \times 10^6$ | $47.3 \times 10^6$ | 0 | $73.1 \times 10^6$ | 3.5 |
| F | $31.6 \times 10^6$ | $43.7 \times 10^6$ | 0 | $69.3 \times 10^6$ | 0 |
| J | no gelation | no gelation | — | $1.5 \times 10^6$ | 0 |
| L | $58.6 \times 10^6$ | $73.1 \times 10^6$ | 21 | $85.3 \times 10^6$ | 45 |

It is seen from Tables 5 and 6 that the gel strength, gel stability and gelation time can be adjusted by changing the polymer concentration and the kind of the reducing agent.

In addition to the ingredients used in the Examples, other ingredients can be used in the Examples as set forth in specification to obtain substantially the same results.

What we claim is:

1. A process for forming a stable aqueous gel in a saline underground environment characterized by high temperatures, said process comprising adding a gelling agent consisting essentially of a chromium compound and at least one reducing agent selected from the group consisting of sodium sulfite, sodium thiosulfate and thiourea to an aqueous solution of a water-soluble copolymer and gelling the resulting mixture in an underground environment which is characterized by high temperature conditions and contains water having high concentrations of salts whereby a stable aqueous gel is formed, said copolymer consisting essentially of 99.5 to 60% by mole of acrylamide, 0.5 to 40% by mole of an unsaturated sulfonic acid or its salt, and 0 to 39.5% by mole of an unsaturated carboxylic acid or its salt, provided that the total content of the unsaturated sulfonic acid or its salt and the unsaturated carboxylic acid or its salt is from 0.5 to 40% by mole, said copolymer having an intrinsic viscosity of at least 10 in $1N$-$NaNO_3$ at $30°$ C.

2. The process of claim 1, wherein said copolymer has an intrinsic viscosity of at least 15 in $1N$-$NaNO_3$ at $30°$ C.

3. The process of claim 1, wherein said copolymer is a copolymer of acrylamide, an unsaturated sulfonic acid or its salt and an unsaturated carboxylic acid or its salt, the total content of the unsaturated sulfonic acid or its salt and the unsaturated carboxylic acid or its salt being at most 40% by mole and the content of the unsaturated sulfonic acid or its salt being at least 0.5% by mole.

4. The process of claim 1, wherein said copolymer is a copolymer of acrylamide and 0.5 to 40% by mole of an unsaturated sulfonic acid salt.

5. The process of claim 1, wherein the unsaturated sulfonic acid salt is an alkali metal salt of an unsaturated sulfonic acid selected from the group consisting of 2-acrylamide-2-methylpropanesulfonic acid, vinylsulfonic acid, allysulfonic acid, 2-methylallylsulfonic acid, styrenesulfonic acid and 2-sulfoethyl methacrylate.

6. The process of claim 1, wherein the formed aqueous gel is stable for at least two weeks in said underground environment.

7. A process for plugging up water leaks in a high temperature saline underground environment which comprises introducing an aqueous solution of a water-soluble copolymer, a gelling agent consisting essentially of a chromium compound, and at least one reducing agent selected from the group consisting of sodium sulfite, sodium thiosulfate and thiourea into an underground environment containing underground water having high concentrations of salts and characterized by high temperature conditions, to form a stable aqueous gel, said water-soluble copolymer consisting essentially of 99.5 to 60% by mole of acrylamide, 0.5 to 40% by mole of an unsaturated sulfonic acid or its salt, and 0 to 39.5% by mole of an unsaturated carboxylic acid or its salt, provided that the total content of the unsaturated sulfonic acid or its salt and the unsaturated carboxylic acid or its salt is from 0.5 to 40% by mole, said copolymer having an intrinsic viscosity of at least 10 in $1N$—$NaNO_3$ at $30°$ C.

\* \* \* \* \*